United States Patent [19]

Freudenschuss et al.

[11] 4,003,646
[45] Jan. 18, 1977

[54] CINE CAMERAS
[75] Inventors: Otto Freudenschuss; Gerd Kittag, both of Vienna, Austria
[73] Assignees: Karl Vockenhuber; Dennis Hauser, both of Vienna, Austria
[22] Filed: Oct. 22, 1975
[21] Appl. No.: 624,650
[30] Foreign Application Priority Data
Oct. 24, 1974 Austria .................. 8543/74
[52] U.S. Cl. .................. 352/141; 352/121; 352/169; 352/180
[51] Int. Cl.² .................. G03B 9/58; G03B 19/18
[58] Field of Search .......... 352/141, 121, 169, 180
[56] References Cited
UNITED STATES PATENTS
3,705,764  12/1972  Reinsch .................. 352/141 X
3,840,295  10/1974  Suzuki .................. 352/141
3,898,000  8/1975  Kabayoshi et al. .......... 352/141 X Primary Examiner—Joseph F. Peters, Jr.
Attorney, Agent, or Firm—Fleit & Jacobson

[57] ABSTRACT

A cine camera with an exposure regulating device for regulating the aperture during operation with a continuously driven shutter and having means for stopping the rotation of the shutter in an open position to provide long exposures. The means for stopping the rotation of the shutter for long exposures operates automatically when the maximum available aperture is inadequate to provide correct exposure when the shutter is driven continuously.

14 Claims, 3 Drawing Figures

CINE CAMERAS

The invention relates to a cine camera with exposure regulating means including a photo-electric transducer and an adjustable diaphragm for varying the filming aperture during continuous operation of the shutter and means for holding the shutter in the open position to provide long exposures, i.e. exposure times greater than during continuous shutter operation.

The German Offenlegungsschrift 2,212,054 discloses a film camera which offers the user the means for obtaining adequately exposed film recordings if the subject brightness is insufficient. For this purpose, the shutter of the film camera is held open until a sufficient amount of light has fallen on each film frame. In this camera, it was necessary for the user to switch off the automatic exposure regulating means manually, and also to switch on the means for long exposure manually. Apart from the inconvenience to the user, this requirement prevented a user from panning without a break from a bright subject to a dark subject.

According to the present invention, there is provided a cine camera including a lens system for imaging light from a subject onto a film; a shutter arranged in the path of the light; exposure regulating means including a photoelectric transducer and an adjustable diaphragm for varying the filming aperture, during continuous operation of the shutter with predetermined exposure time for each film frame, so as to provide correct film exposure; sensing means for sensing when the maximum available aperture is inadequate for correct exposure within the said predetermined exposure time; and means operable in response to an output of said sensing means for holding the shutter open, for each film frame, for a sufficient time to achieve correct exposure.

In a first embodiment of the invention, the exposure regulating means includes a circuit for producing an error signal for correcting the position of the adjustable diaphragm and in which the sensing means is responsive to persistence of an error signal in said circuit.

In a second embodiment of the invention, the sensing means comprises a mechanical switch arranged to cooperate with an abutment on a movable member of said adjustable diaphragm determining the filming aperture and to be actuated when the filming aperture set by the adjustable diaphragm corresponds to said maximum available aperture.

The invention will now be described further, by way of example, with reference to the accompanying drawings, in which.

Figure 1:
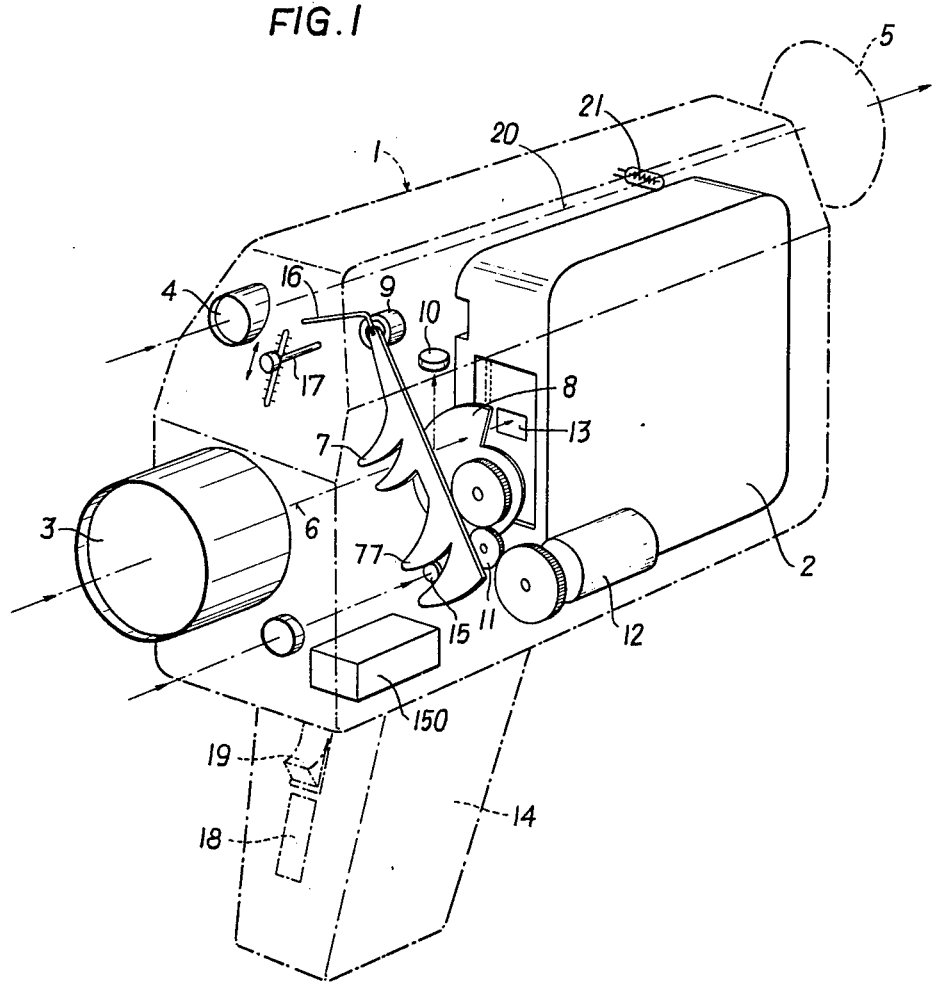
FIG. 1 is a diagrammatic view of a film camera.

In FIG. 1, the numeral 1 designates a cine camera using a film stored in a cassette 2. The camera is provided with a main lens 3 and a view-finder lens 4. The view-finder image is viewed through an eye cup 5. A butterfly diaphragm 7 and a rotary shutter 8 are situated in the optical path 6 of the lens 3. The butterfly diaphragm 7 is adjusted by means of a galvanometer 9 energised by a circuit including a photoresistor 10. A semi-reflecting mirror not illustrated is provided in the optical path 6 of the lens 3, to reflect some of the light onto the photoresistor 10. The film in the cassette 2 is transported by an electric motor 12 which also drives the shutter 8 by way of a transmission 11. The image window 13 is shown, diagrammatically behind the rotating shutter 8. Power is supplied to the motor 12 and to the galvanometer 9 by dry batteries which are not shown and can be disposed, for example, in the handle 14 of the film camera.

Light is also directed toward a second photoresistor 15 which is disposed behind a butterfly diaphragm 77 which is secured to and movable with the butterfly diaphragm 7.

Electronic circuitry 150 is provided which serves, inter alia to control the diaphragm 7 or 77 in dependence upon the electrical output of the photoresistor 10. As may be seen by reference to FIG. 1, the diaphragm 7 is provided with an extension 16 associated with a stop 17. The extension 16 and the stop 17 are arranged with respect to each other in such a manner that it is possible to limit the opening of the diaphragm, i.e. pivoting in the anti-clockwise direction of the diaphragm 7, 77 in the illustrated embodiment. The stop 17 is arranged so that its position with respect to the path of movement of the extension 16 is adjustable. The adjustment of the stop 17 enables the diaphragms 7, 77 to be limited to any desired maximum aperture. If the subject brightness, as detected by the photoresistor 10, should require a larger aperture than the maximum allowed by the stop 17, then the diaphragm will reach this position and go no further. Stopping of the extension 16 and therefore of the diaphragm 7, 77 by means of the adjustable stop 17 is detected, and is utilized for controlling the rotary shutter to vary the exposure time.

If the subject brightness, on the other hand, is within the regulating range of the diaphragm, the rotary shutter will be continuously driven and the exposure time of the film remains constant.

The electronic circuitry 150 of the camera additionally defines the exposure time when the rotary shutter 8 is held open, the amount of light admitted through the diaphragm being detected by the photoresistor 15.

The handle 14 is provided with two operating controls for the user of the camera 1. An operating control switch 18 operates the electronic circuitry of the camera and automatically performs the setting of the aperture. On completion of the aperture adjustment, a subject is photographed by operation of the shutter release 19. If the diaphragm 7 has moved against the stop 17, a readily visible optical indication will appear to the user of the camera in the optical path 20 of the finder 4, due to an incandescent lamp 21 being switched on. The light signal of the incandescent lamp 21 draws the attention of the user of the camera 1 to the fact that at the diaphragm aperture selected by the user the electronic equipment 150 calls for an exposure time which is longer than that associated with a continuously driven shutter 8. The user of the camera can then take precautions necessary to avoid camera shake, for example by supporting the camera in a stationary position on a tripod. A tripod symbol can also be made visible in the optical path of the finder 4 by means of the small lamp 21 in order to indicate the need for longer exposure times.

Figure 2:
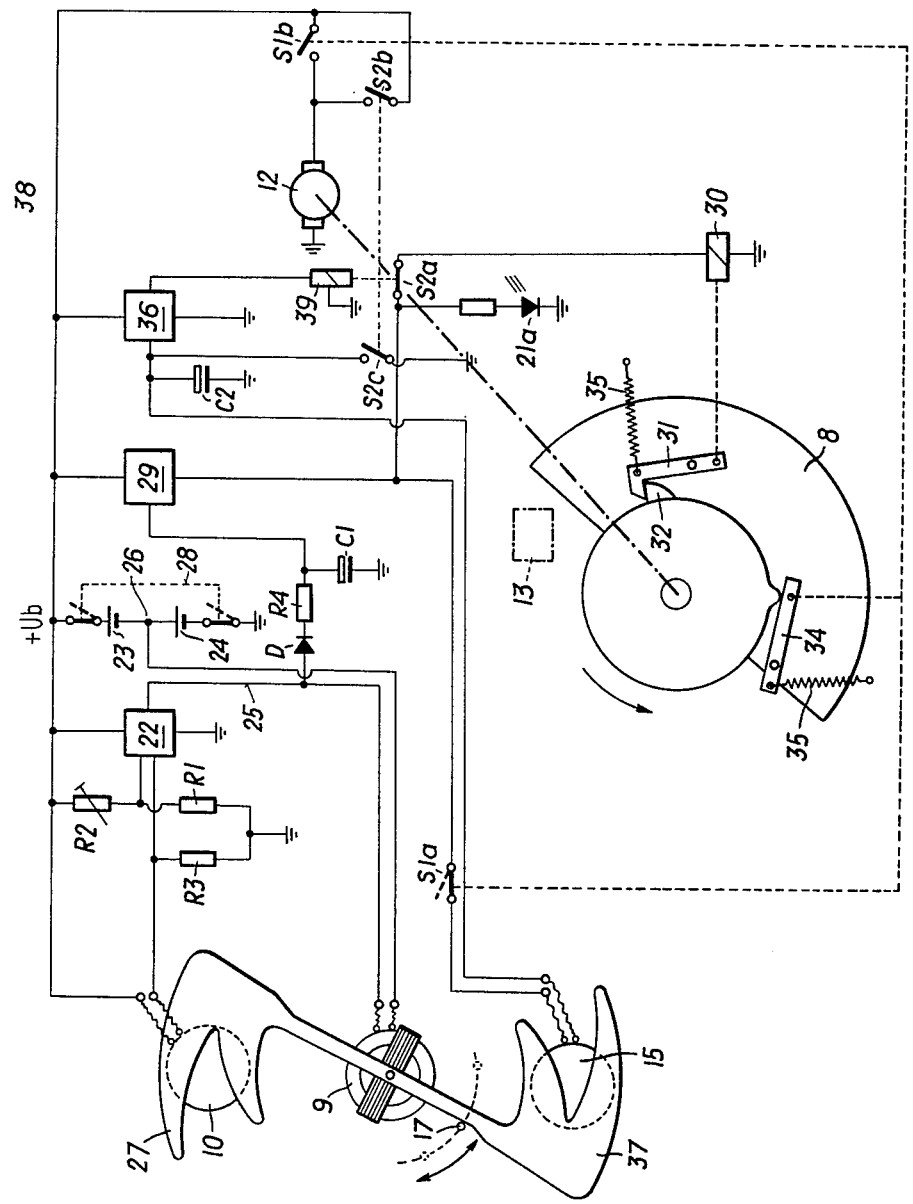
FIGS. 2 and 3 show, respectively, a first and a second embodiment of the invention.

FIG. 2 shows one embodiment of the electronic circuitry 150 in FIG. 1, the mechanical or electrical components of the camera which are directly interconnected with the electronic equipment of the camera being also shown in diagrammatic form.

According to FIG. 2, the photoresistor 10 for controlling a diaphragm 27 in the optical path of the main lens is associated with a bridge circuit. The bridge circuit is made up of fixed value resistors R1 and R3, an adjustable resistor R2, and the photoresistor 10. Tappings from the two branches of the bridge are connected to a differential amplifier 22. The resistor R2 is variable to take into account the speed of the film, filter factors and the like. Two dry batteries 23, 24, connected in series, are provided to supply current to the bridge circuit and to the differential amplifier 22, the electrical earth of the circuit being at negative potential. One side of the galvanometer 9 for adjusting the diaphragm 27 is connected to the output 25 of the differential amplifier 22 and the other side to the centre tapping of the power supply formed by the batteries 23, 24.

The system as so far described is an automatic diaphragm control system, the bridge, comprising the resistors R1, R2 and R3 and the photoresistor 10, being self-balancing as it is arranged in a closed loop with negative feedback. The diaphragm 27, driven by the galvanometer 9, is provided to this end in front of the photoresistor 10 so that as the output of the differential amplifier changes, so does the resistance value of the photoresistor 10.

It is not necessary that the same diaphragm be used for the main lens as for the photoresistor 10 since two separate but mechanically coupled diaphragms may alternatively be used.

The diaphragm 27 is associated with an adjustable stop 17 limiting the maximum apertures for light falling on the cine film as well as the photoresistor 10. The operation of the automatic diaphragm regulating device is as follows: After closing the contacts 28 in the circuit of the batteries 23, 24, through the switch 18 in the handle 14 (FIG. 1), the light striking the photoresistor 10 enables voltages, to be tapped off from the tappings of the bridge branches depending on the position of the diaphragm 27 in front of the photoresistor 10 and the light intensity. These voltages are compared with each other in the differential amplifier 22. A control voltage for the galvanometer is then available at the output 25 of the differential amplifier 22. When the exposure time is defined by the continuously driven shutter 8, it follows that the diaphragm aperture is dependent solely upon the brightness and must be increased or reduced, so that a constant amount of light is always available for exposing the film. To this end, the galvanometer 9 can be driven in the clockwise or anti-clockwise direction, depending on the polarity of the output voltage of the differential amplifier 22, i.e., the diaphragm 7 is moved by the galvanometer 9 into the position in which no further voltage difference occurs at the inputs to the differential amplifier 22.

If the stop 17, which can be adjusted along an arcuate path, according to FIG. 2, by means of a handle not shown, is set to a pre-defined diaphragm aperture and thus prevents the diaphragm from being opened any further, it will be necessary to increase the exposure time of the film in the cassette 2 to enable a sufficiently large amount of light to reach the film. This means that a so-called "long exposure" must be made. The "long exposure" must therefore always be performed when the diaphragm moves against the stop. The adjustability of the stop 17 therefore enables a long exposure to be obtained not only when the diaphragm has reached its maximum aperture, but also at any selected aperture as set by the stop 17, provided the exposure time with the continuously driven rotating shutter 8 is insufficient to give adequate exposure of the film at the selected aperture.

To increase the exposure time or to carry out a "long exposure," it is necessary to hold the rotary shutter 8 open until the required amount of light has reached the film (the image window 13 is not covered by the rotating shutter 8).

In FIG. 2, changing over to "long exposure" is performed automatically. To this end, the output 25 of the differential amplifier 22 is provided with a timing circuit (R.C. circuit R4, C1) which controls the elements for performing long exposures. During the regulating operation, the galvanometer 9 requires a specific amount of regulating time for moving the diaphragm 27 into the position for correct exposure. The control voltage for the galvanometer 9 is available at the output 25 of the differential amplifier 22 during the above-mentioned regulating period. If the diaphragm vane 27 moves against the stop abutment 17, set to a specific value, because the subject brightness is insufficient for the said diaphragm aperture, a voltage differential will continue to appear at the inputs of the differential amplifiers 22 and the control voltage for the galvanometer 9 will continue to be available at the output of the differential amplifier 22. This control voltage which continues to be available at the output 25 of the differential amplifier 22 is detected by the timer R4, C1. The time constant of the R.C. circuit R4, C1 is selected so that a specific voltage is made available at the output of the R.C. circuit only after a time which is longer than that required by the exposure regulating device for adjusting the diaphragm, for example from one extreme position to the other extreme position. This ensures that the specific voltage at the output of the integrating element and therefore a control voltage for the devices required for "long exposure" is available only if the diaphragm 27 moves against the stop abutment 17 and the output voltage of the differential amplifier 22 is therefore retained.

The output of the R.C. circuit R4, C1 is connected to the control input of a switch 29 which is connected to the operating voltage for the entire circuit concerned with holding the shutter 8 open. The switch 29, which can be constructed for example as a semiconductor switch or an electromagnetic relay, is provided to activate those elements which perform the operation of "long exposure." These elements comprise a timing device and a mechanical arrangement controlled thereby for stopping the shutter 8 in the open position and for subsequently starting the shutter 8.

If the diaphragm 27 bears on the stop abutment 17, the control voltage for the galvanometer 9 will continue to be available at the output 25 of the differential amplifier 22. This control voltage closes the switch 29, thus energizing an electro-magnet 30. The electro-magnet 30 moves a pawl 31 against spring force (tension spring 35a) into the path of a nose 32 which is disposed on the shutter 8. The nose 32 is mounted on the rotary shutter 8 in such a position that when it strikes against a pawl 31 the shutter 8 is retained in the open position. The shutter 8 is also provided with a cam 33 which is associated with an operating lever 34. The operating lever 34 is also springbiased (tension spring 35) and operates two switches S1a, S1b. The switch S1a activates the timing device for the "long exposure." This timing device comprises a limit switch 36 (i.e. a circuit which produces an output signal when its input signal exceeds a predetermined value) the input of which is connected to a capacitor C2 that can be charged through the further photoresistor 15. The photoresistor 15 is associated with a butterfly diaphragm 37 which is also rigidly coupled to the butterfly diaphragm 27 and is thus adjusted by the galvanometer 9 in the same sense as the diaphragm of the main optical system and the photoresistor 10.

Depending on the amount of light which strikes the photoresistor 15, the capacitor C2 will be charged at different rates. The length of charging time determines the exposure time of the film. The switch S1b is opened simultaneously with the closing of the switch S1a. The switch S1b supplies the operating voltage through the release switch 38 to the motor 12. While the capacitor C2 is charged through the photoresistor, shutter 8 is stopped by the pawl 31, and the motor current is switched off by the switch S1b. The relay 39 connected to the output of the limit switch 36 will be energized when the voltage across the capacitor C2 reaches the limit voltage of the limit switch 36. The relay 39 is provided with three switches S2a, S2b, S2c which are electrically independent of each other. The switch S2a is connected as a normally closed contact in the circuit of the electro-magnet 30. The switch S2b is connected as a normally open contact in the power supply to the motor 12 and the switch S2c is connected as a normally open contact in parallel to the capacitor C2 to discharge the latter.

Accordingly, if the relay 39 is energized the electro-magnet 30 will be briefly de-energized and the pawl 31 will be raised off the nose 32. The switch S2b is simultaneously closed so that the motor 12 is restarted. The capacitor C2 is finally discharged so that it is discharged to a specific value for a new exposure operation. The shutter 8 then again executes a full rotation until the operating lever 34 is adjusted by the cam 33 and the nose 32 again moves against the pawl 31.

Since "long exposures" involve a risk of camera shake due to the relatively long time of the exposure, it is advisable to utilize a tripod. An indicating device 21 is provided to draw the attention of the user of the camera to this fact. The indicating device (indicator lamp 21, FIG. 1; light-emitting diode 21a, FIG. 2) is connected to the output of the switch 29. An indication is therefore provided as soon as the switch 18 is operated for example by picking up the camera and before the release 19 is pressed.

The switch 29 can also be constructed as a thyristor switch to ensure that once a long exposure is made it can be continued until the camera is put down even if the light conditions alter favourably. The circuit can also be arranged so that any changeover to brief time exposure is made when the shutter release is again released. As regards the embodiment according to FIG. 2, it should also be pointed out that the circuit R4, C1 is connected via a diode D to the output 25 of the differential amplifier 22. The purpose of the diode D is to supply the integrating network with voltage of only that polarity which will result in opening of the diaphragm 27, 37 or 7, i.e. the long exposure only takes place in insufficient light and not in excessive brightness.

Figure 3:
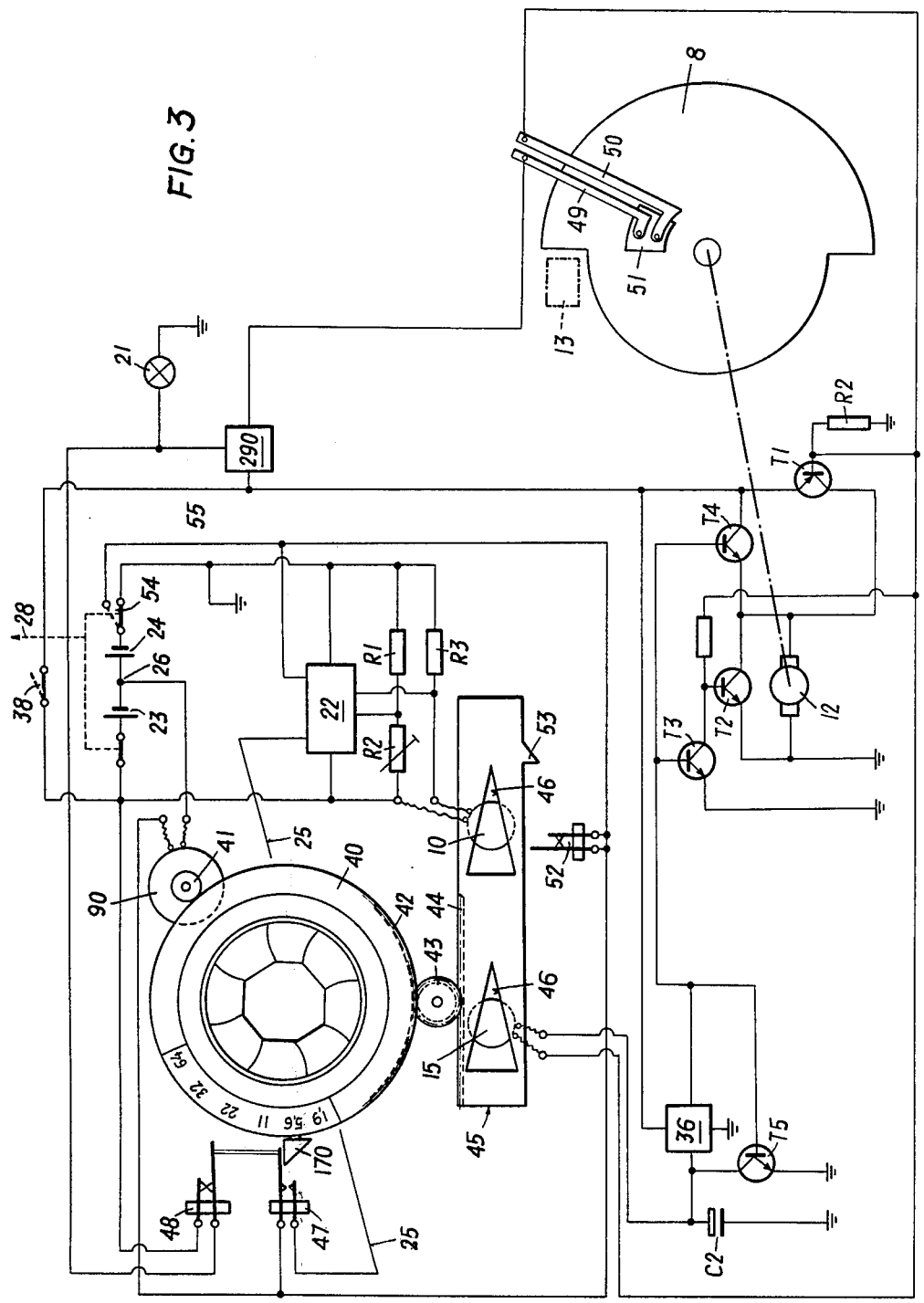

The diaphragm disposed in the optical path of the main lens in FIG. 3 is designated 70. The diaphragm 70 is shown diagrammatically as an iris diaphragm. An automatic diaphragm regulating circuit with the photoresistor 10 is also provided and is embodied in accordance with FIG. 2. Only the galvanometer is replaced by a servomotor 90. The diaphragm 70 is provided with a setting ring 40 which can be adjusted by means of a driving roller 41 which is mounted on the output drive of a motor 90. The adjusting ring 40 has teeth into which a fixed but rotatable pinion engages. The teeth 44 of a diaphragm slide 45 also mesh with the said pinion 43. The diaphragm slide 45 is provided with two diaphragm apertures 46, for example constructed in triangular form, which are disposed in front of the photoresistors 10 and 15. If the diaphragm 70 is adjusted, the diaphragm in front of the photoresistors will be adjusted in the same sense.

The adjusting ring 40 of the diaphragm 70 supports a stop 170 which is adjustably and lockably supported on the said diaphragm. The stop 170 is provided for tripping a switch 47 which is connected in the circuit of the motor 90. The diaphragm aperture values, for example 1.9 to 64, are indicated next to the stop 170 which is provided with a handle, not shown, for operation by the camera user. The stop 170 in FIG. 3 is set for a maximum aperture diaphragm aperture 5.6. When selecting a maximum diaphragm aperture and the light conditions require a larger diaphragm aperture, the diaphragm 70 is stopped at the diaphragm aperture set by the stop 170. The switch 48 is closed simultaneously with the opening of the switch 47. The switch 48 supplies the operating voltage to the elements for enabling a "long exposure" to be made that is to say it is supplied to the means for stopping the shutter 8 and for defining the time during which the shutter 8 remains in the open position. The construction of the timing device for long exposure is similar to that of FIG. 2 except that electronic switches replace the mechanical switches. The switch 48 which can also drive a thyristor switch 290 where appropriate, supplies operating voltage to the photoresistor 15 through a contact on the shutter 8. The contact comprises two contact brushes 49, 50 which are linked by a contact plate 51 mounted on the shutter 8. The contact plate 51 is arranged on the shutter 8 so that contact between the two brushes 49 and 50 is established only when the shutter 8 is in the open position. The brushes are otherwise electrically isolated from each other and are disposed in the casing of the camera 1.

The photoresistor 15 again charges the capacitor C2 until the limit voltage of the limit switch 36 is reached. The time required for charging the capacitor C2 is used to define the exposure time, as already described.

If the handle switch 28 is operated and, due to insufficient subject brightness, the diaphragm adjusting ring and the stop 170, set to a pre-defined value, moves against the switch 47, the servomotor will be stopped when the diaphragm is adjusted, as already mentioned, and operating voltage is supplied to the timing device for an exposure with the shutter 8 stopped in the open position. Current is simultaneously supplied to the indicator lamp 21 so that this is illuminated to provide the camera user with an indication as regards the kind of exposure. When the shutter release 38 is operated (after mounting on a tripod to avoid camera shake), the motor 12 will drive rotary shutter 8 which is then stopped in the open position. This is the result of the transistor T1, which supplies voltage to the motor 12, being driven to cut-off through the contact 49, 50, 51. The transistor T2 is simultaneously driven into the conductive state by the voltage from the contact 50. The transistor T2 short-circuits the terminals of the motor 12, thus causing the motor or the rotating shutter 8 to stop instantly. The voltage made available through the contacts on the shutter 8 is utilized via the photoresistor 15 to charge the capacitor C2. When the limit voltage of the limit switch 36 is reached and an adequate exposure time has been obtained, the output of the limit switch 36 will make available a further control voltage the purpose of which is to drive the transistor T2 to cut-off by driving the transistor T3 into the conductive state, so that the shortcircuit across the terminals of the motor 12 is eliminated to enable operating voltage to be supplied to the motor 12 by driving the transistor T4 into the conductive state. Accordingly, the motor 12 or the shutter 8 are therefore again instantly driven, until the contact brushes 49, 50 are again linked by the contact plate 51 on the rotating shutter 8 in the open position of the shutter.

The control voltage at the output of the limit switch 36 is utilized for discharging the capacitor C2 simultaneously with restarting the rotating shutter 8. To this end, the collector-emitter connection of the transistor T5 is connected parallel to the capacitor C2.

Since the switch 290 is constructed as a thyristor switch, the timing device is activated for as long as the release 38 is kept closed under the appropriate conditions (operation of the switch 48, inadequate light conditions).

A limit switch 52 for the diaphragm regulating device is also shown in FIG. 3. The switch 52 disconnects the circuit of the servomotor 90 when the diaphragm adjusting ring or the diaphragm slide 45 moves against the minimum diaphragm aperture. A nose 53 is provided on the diaphragm slide 45 for this purpose. The purpose of the limit switch 52 is to protect the transmission connecting the diaphragm adjusting ring to the diaphragm slide against damage and to drive the diaphragm into its smallest diaphragm aperture after the handle switch 28 is released by the user of the camera 1. To this end, one contact 54 of the handle switch 28 is constructed as a changeover switch and in its inoperative state it supplies the servomotor 90 via the conductor 55 with the voltage potential which will drive the motor in the direction required to close the diaphragm so that the stop abutment 170 is freely adjustable. The stop abutment 170 can also be constructed so that it can be moved past the switch 47 or 48 for adjustment purposes and comes into action only when the handle or the like is actuated by the user. The changeover switch 54 or the limit switch 52 is not required in this case.

If the diaphragm is closed, the stop 170 can be set to a desired diaphragm aperture. If the camera is set into readiness for use by operating the handle switch 18, the servomotor 90 will be activated and the diaphragm will be set to the required value or, if called for by the light conditions, it is stopped at the preselected diaphragm aperture by operation of the switch 47 or 48 and the timing device is then placed into its readiness state. As already described, this prevents the rotating shutter being continuously driven for subsequent film exposures but is always stopped in the open position.

Though a self-balancing bridge circuit is provided as diaphragm regulating device in both the embodiments illustrated, the diaphragm regulating device can of course also have any other construction.

It is possible to replace the mechanical contact 49, 50, 51 by an electronic contact. For example, the electronic switch can comprise a light barrier, photo-electric transducers being disposed on both sides of the rotating shutter 18, one opening in the rotating shutter 8 being associated with the said transducers. This opening can be situated approximately at the position of the contact plate 51. It is also feasible to replace the plate 51 by means of a light-reflecting coating which will then transmit a light beam of a light source as a control signal to a photo-electric transducer when the shutter 8 is in the appropriate position. In this context it should be noted that quick-acting switches with low switching inertia should be used as photo-electric transducers to ensure precise stopping of the rotating shutter 8 in the open position. A light-emitting diode is advantageously used as light source and is characterized by its low current consumption. Photodiodes or photoswitching transistors can then be used on the receiver side. By contrast to the embodiment according to FIG. 2, the embodiment illustrated in FIG. 3 offers the further advantage that the switching means required in the motor circuit are constructed in "iron-free" form. Inter alia, this leads to a more compact construction of the entire camera. Furthermore, according to FIG. 3, the shutter 8 is not provided with any form of mechanical stop abutments which, although only small, could nevertheless impose mechanical loadings on the shutter 8.

Switches with two stable states can be disposed parallel to the release 38 or the handle 28 to dispense with the need for continuous operation of the release or of the handle by the user for "long exposures."

A further advantage is obtained by virtue of the fact that the construction according to FIG. 3 leads to a camera with low operating noise. The invention also provides the means for enabling a "long exposure" to adjoin without any interruption on a "normal exposure."

We claim:

1. In a cine camera including a lens system for image light from a subject onto a film; and a shutter arranged in the path of the light; in combination
   exposure regulating means including a photo-electric transducer and an adjustable diaphragm for varying the filming aperture, during continuous operation of the shutter with predetermined exposure time for each film frame, to provide correct film exposure;
   sensing means for sensing when the maximum available aperture is inadequate for correct exposure within the said predetermined exposure time; and
   means operable in response to an output of said sensing means for holding the shutter open, for each film frame, for a sufficient time to achieve correct exposure.

2. A cine camera as in claim 1, wherein the exposure regulating means includes a circuit producing an error signal for correcting the position of the adjustable diaphragm and wherein the sensing means is responsive to persistence of an error signal in said circuit.

3. A cine camera as in claim 2, wherein the sensing means includes an R.C. circuit connected to receive said error signal and having a time constant greater than the maximum time required for regulation of said filming aperture.

4. A camera as in claim 1, in which means are provided for limiting the extent of adjustability of the filming aperture so as to allow the maximum available aperture to be varied.

5. A camera as in claim 1, wherein the sensing means comprises a mechanical switch arranged to co-operate with an abutment on a movable member of said adjustable diaphragm determining the filming aperture and to be actuated when the filming aperture set by the adjustable diaphragm corresponds to said maximum available aperture.

6. A cine camera as in claim 5, wherein the mechanical switch and the said portion of the said movable member are relatively displaceable to vary the aperture at which the said mechanical switch is actuated.

7. A camera as in claim 6 wherein said diaphragm is an iris diaphragm having an adjusting ring and wherein the portion of the adjusting ring co-operating with the mechanical switch is a stop circumferentially displaceable and lockable on said adjusting ring.

8. A cine camera as in claim 1 wherein the said means for holding the shutter open includes a timing circuit having a photo-electric transducer, an integrating circuit for integrating the output signal of the photo-electric transducer, a limit switch for producing an output signal when the output signal of the integrating circuit attains a predetermined level and means for maintaining the shutter open for each frame until an output signal is produced by the limit switch.

9. A cine camera as in claim 8, wherein the integrating circuit is a R.C. circuit comprising a charging resistor and a storage capacitor adapted to be discharged during each cycle of the shutter when the shutter is closed and to be charged during such time as the shutter is open.

10. A cine camera as in claim 9, wherein the means for maintaining the shutter open comprise a pawl and a co-operating nose on the shutter, the pawl being brought into the path of the nose in response to an output signal from the said sensing means and being withdrawn from the path of the nose in response to an output signal from said limit switch.

11. A cine camera as in claim 10, further comprising a first switch operable by the shutter for initiating the flow of current to the storage capacitor and a second switch for preventing rotation of the shutter.

12. A cine camera as in claim 9, having a motor for driving the shutter and wherein the means for maintaining the shutter open comprises first switch means responsive to an output signal from said sensing means for discontinuing the flow of current to said motor while the shutter is open and means for re-initiating the flow of current to the motor in response to an output signal from the said limit switch.

13. A cine camera as in claim 12, wherein the first switch means comprises a pair of contact brushes in sliding contact with the shutter and a bridging contact movable with the shutter.

14. A cine camera as in claim 1, in which the means for holding the shutter open during each film frame in response to an output signal from the sensing means continues to remain operative should the output signal of the sensing means subsequently disappear.

* * * * *